(12) United States Patent
Chessin et al.

(10) Patent No.: US 7,596,738 B2
(45) Date of Patent: Sep. 29, 2009

(54) METHOD AND APPARATUS FOR CLASSIFYING MEMORY ERRORS

(75) Inventors: Stephen A. Chessin, Mountain View, CA (US); Tarik P. Soydan, Acton, MA (US); Louis Y. Tsien, Watertown, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 683 days.

(21) Appl. No.: 10/992,056

(22) Filed: Nov. 17, 2004

(65) Prior Publication Data

US 2006/0112306 A1 May 25, 2006

(51) Int. Cl.
*G06F 11/00* (2006.01)
(52) U.S. Cl. .............................. 714/763; 711/3; 714/12; 365/200
(58) Field of Classification Search .................. 714/763
See application file for complete search history.

(56) References Cited

U.S. PATENT DOCUMENTS

| | | | | |
|---|---|---|---|---|
| 4,047,157 A | * | 9/1977 | Jenkins | 710/38 |
| 4,649,475 A | * | 3/1987 | Scheuneman | 711/149 |
| 4,835,729 A | * | 5/1989 | Morton | 712/22 |
| 5,511,164 A | * | 4/1996 | Brunmeier et al. | 714/53 |
| 6,467,048 B1 | * | 10/2002 | Olarig et al. | 714/7 |
| 6,539,503 B1 | * | 3/2003 | Walker | 714/703 |
| 6,615,340 B1 | * | 9/2003 | Wilmot, II | 712/209 |
| 6,934,810 B1 | * | 8/2005 | Williams et al. | 711/137 |
| 7,222,270 B2 | * | 5/2007 | Meaney et al. | 714/48 |
| 2003/0145257 A1 | | 7/2003 | Fields, Jr. | |

FOREIGN PATENT DOCUMENTS

| EP | 0442616 A2 | 1/1991 |
|---|---|---|
| EP | 0442616 A3 | 1/1991 |

OTHER PUBLICATIONS

Argyrides, C.; Zarandi, H.R.; Pradhan, D.K., Matrix Codes: Multiple Bit Upsets Tolerant Method for SRAM Memories, Sep. 2007, IEEE, 22nd.*
Argyrides, C.; Zarandi, H.R.; Pradhan, D.K., Multiple upsets Tolerance in SRAM Memory, May 2007, IEEE.*

(Continued)

*Primary Examiner*—M. Mujtaba K Chaudry
*Assistant Examiner*—Enam Ahmed
(74) *Attorney, Agent, or Firm*—Park, Vaughan & Fleming LLP

(57) ABSTRACT

One embodiment of the present invention provides a system that determines the cause of a correctable memory error. First, the system detects a correctable error during an access to a memory location in a main memory by a first processor, wherein the correctable error is detected by error detection and correction circuitry. Next, the system reads tag bits for a cache line associated with the memory location, wherein the tag bits contain address information for the cache line, as well as state information indicating a coherency protocol state for the cache line. The system then tests the memory location by causing the first processor to perform read and write operations to the memory location to produce test results. Finally, the system uses the test results and the tag bits to determine the cause of the correctable error, if possible.

21 Claims, 3 Drawing Sheets

OTHER PUBLICATIONS

Zarandi, H.R.; Miremadi, S.G.; and Sarbazi-Azad, H, Fault detection enhancement in cache memories using a high performance placement algorithm, Jul. 2004, IEEE, 10th, p. 1 and 3-4.*

Miremadi, S.G.; Zarandi, H.R., Reliability of protecting techniques used in fault-tolerant cache memories, May 2005, IEEE.*

* cited by examiner

METHOD AND APPARATUS FOR CLASSIFYING MEMORY ERRORS

BACKGROUND

1. Field of the Invention

The present invention relates to techniques for handling errors in computer systems. More specifically, the present invention relates to a method and an apparatus for classifying memory errors in a computer system.

2. Related Art

As computer memories grow increasingly larger, and individual memory cells become progressively smaller, it is becoming considerably more likely for errors to occur in computer memories due to natural phenomenon such as cosmic rays. Furthermore, as computer systems continue to increase in speed, data must be transferred at faster rates between processor and memory. This creates yet another source for data errors because faster data rates increases the likelihood of errors while transferring data between processor and memory.

Computer systems typically use error correcting codes to detect and correct memory errors. This is usually involves storing error-correcting code (ECC) bits along with each data word in memory, and then transferring the ECC bits along with a data word when the data word is transferred between main memory and the processor (or associated cache memory). Commonly used error-correcting codes typically support double-error detection and single-error correction for each data word. Hence, computer systems are generally able to detect double-bit errors and correct single-bit errors in a data word retrieved from main memory.

Some computer systems go one step further and provide mechanisms to determine the cause of a memory error. For example, if a correctable error is encountered while reading a data word from main memory, the computer system can read the data word a second time to determine the cause of the memory error. If the error does not occur during the second read, the system can determine that the error is an "intermittent error," which can be caused, for example, by transient noise on the data lines between the processor and main memory.

On the other hand, if the second read also encounters an error, the computer system can use its ECC circuitry to correct the data word and write it to main memory. Then, to determine the cause of the error, the computer system can read the data word for a third time. If the third read also encounters the error, the system can determine that the error is a "sticky error," which, for example, is caused by a "stuck" bit in the data word in main memory. On the other hand, if the third read returns the corrected data word, the system can determine that the error was a "persistent error," which could have been caused by a change in the state of the data word in main memory.

Unfortunately, the above-described mechanisms to determine the cause of a memory error can become very complicated in the presence of cache memories. Note that, a cache memory mediates access to the main memory. However, in doing so, a cache memory interferes with attempts to retry an errant memory access, and can thereby interfere with the process of determining the cause of a memory error.

For example, in order to cause the computer system to perform a second read operation to a memory location, it is first necessary to flush the cache line associated with the memory location from the cache, so that the read operation will actually force a cache line to be retrieved from main memory. However, if the cache line is dirty when this flush takes place, the flush will cause the cache line to be stored back to memory, which may correct the error. Hence, the subsequent second read from the memory may not encounter the error. This can result in the error being diagnosed as an intermittent error, even though the error was actually a persistent error. (This type of mis-diagnosed error is referred to as a "false intermittent" error.)

Furthermore, existing techniques cannot differentiate between certain types of memory errors. For example a "leaky cell" condition can arise in which a memory cell does not hold charge. In this case, the above-described mechanism will incorrectly determine that the error is a persistent error, instead of a leaky cell. Furthermore, errors can arise because a specific processor in a multiprocessor system is a "bad reader" or a "bad writer." Neither of these types of errors can be diagnosed with existing techniques.

Obviously, effective remedial action can only be taken if the cause of the memory error can be determined accurately. For example, unless the memory error is accurately diagnosed, it is impossible to ascertain whether a part needs to be replaced, and if so, which part.

Therefore, what is needed is a method and an apparatus that accurately determines the cause of a memory error within a computer system without the above-described problems.

SUMMARY

One embodiment of the present invention provides a system that determines the cause of a correctable memory error. First, the system detects a correctable error during an access to a memory location in a main memory by a first processor, wherein the correctable error is detected by error detection and correction circuitry. Next, the system reads tag bits for a cache line associated with the memory location, wherein the tag bits contain address information for the cache line, as well as state information indicating a coherency protocol state for the cache line. The system then tests the memory location by causing the first processor to perform read and write operations to the memory location to produce test results. Finally, the system uses the test results and the tag bits to determine the cause of the correctable error, if possible.

In a variation on this embodiment, testing the memory location involves: clearing an asynchronous fault status register (AFSR) and an asynchronous fault address register (AFAR), which contain information about the correctable error; flushing the cache line from the cache; reading the memory location again, thereby causing the cache line to be pulled back into the cache from main memory; reading and clearing the AFSR and AFAR registers; allowing the error detection and correction circuitry to correct the correctable error; and flushing the cache line (with the error corrected) back to main memory.

In a further variation, reading the memory location again involves performing an atomic compare-and-swap (CAS) operation to ensure that the cache line exists in the modified state in the cache.

In a further variation, if reading the memory location again does not cause a correctable error, the system determines the cause of the correctable error by examining the previously read tag bits. The system determines that the correctable error is an intermittent error if, (1) address bits from the tag match corresponding bits of the address for the correctable error read from the AFAR, and (2) if the state bits from the tag indicate that cache line was in either the shared or exclusive states in cache at the time the tag bits were read.

In a further variation, if reading the memory location again causes a correctable error, the system reads the memory location yet again and reads and clears the AFSR and AFAR registers.

In a further variation, if reading the memory yet again does not cause a correctable error, the system reads the memory location after a pre-specified time interval. If reading the memory location after the pre-specified time interval causes a correctable error, the system determines that the memory location is leaky. Otherwise, the system determines that the correctable error is a persistent error.

In a variation on this embodiment, if reading the memory location yet again causes a correctable error, the system causes a second processor to classify the correctable error. If the second processor does not detect an error, the system determines that the first processor is a bad reader. If the second processor detects an error that is not a sticky error, the system determines that the first processor is a bad writer. Otherwise, if the second processor detects a sticky error, the system determines that a least one bit in the memory location is stuck.

Table 1 presents a table for classifying memory errors in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer System

Figure 1:
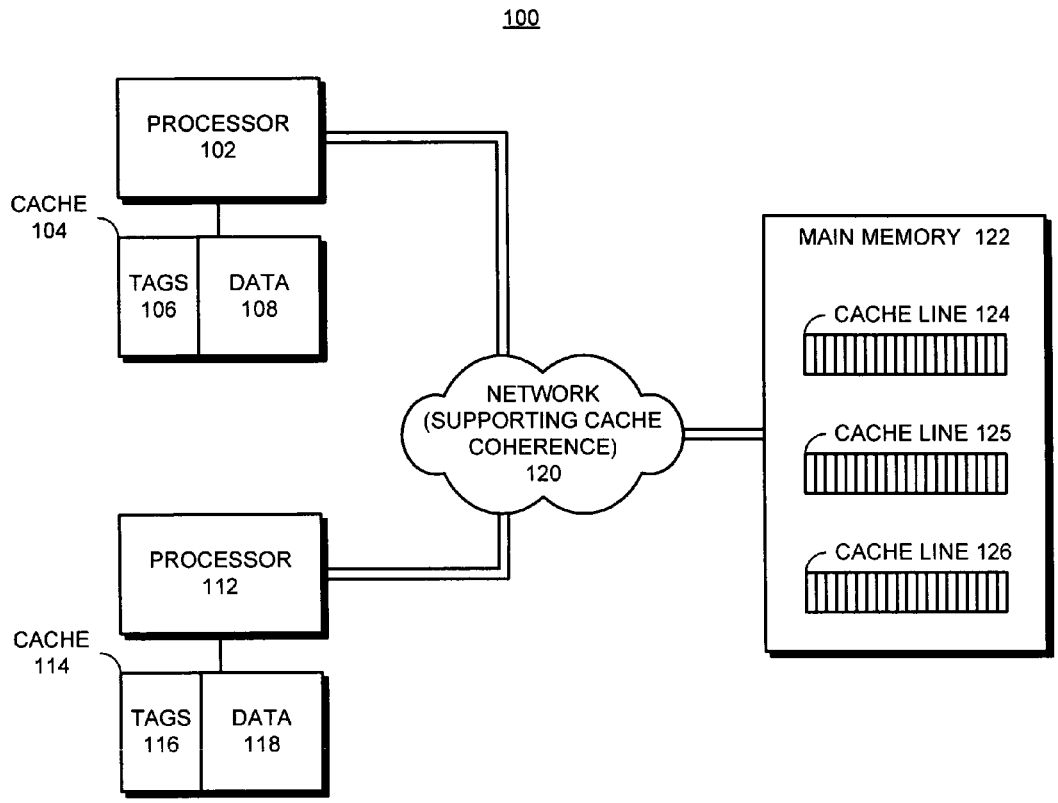
FIG. 1 illustrates a computer system in accordance with an embodiment of the present invention.

FIG. 1 illustrates a computer system 100 in accordance with an embodiment of the present invention. Computer system 100 can generally include any type of computer system with one or more caches and one or more processors. This includes, but is not limited to, a computer system based on a microprocessor, a mainframe computer, a digital signal processor, a portable computing device, a personal organizer, a device controller, and a computational engine within an appliance.

As illustrated in FIG. 1, computer system 100 includes processors 102 and 112, which are associated with caches 104 and 114, respectively. Caches 104 and 114 contain tags and data for cache lines that are retrieved from main memory 122. Main memory 122 can include any type of random access memory, which stores code and data for computer system 100. In particular, main memory 122 can store data which is associated with cache lines, including cache lines 124-126.

Cache lines 124-126 can be transferred between main memory 122 and caches 104 and 114 through a communication network 120, which supports a cache-coherence protocol to ensure that copies of cache lines in caches 104 and 114 are kept coherent with the corresponding data for the cache lines in main memory 122. For example, in one embodiment of the present invention, computer system 100 supports a variation of a MOESI (Modified-Owned-Exclusive-Shared-Invalid) cache coherence-protocol.

Computer system 100 also provides support for classifying memory errors, as will be described in more detail below with reference to FIGS. 2-5.

Data Word

Figure 2:
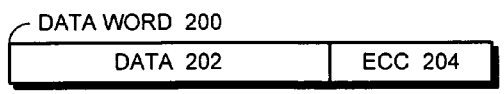
FIG. 2 illustrates a data word in memory in accordance with an embodiment of the present invention.

FIG. 2 illustrates a data word 200 in main memory 122 in accordance with an embodiment of the present invention. Data word 200 includes data 202 as well as ECC bits 204, which supports single-error correction and double-error detection for the composite data word, which includes both data 202 and ECC bits 204.

Cache Line Tag

Figure 3:
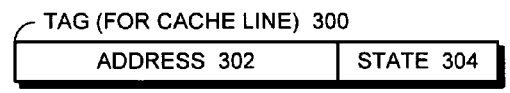
FIG. 3 illustrates a tag for a cache line in accordance with an embodiment of the present invention.

FIG. 3 illustrates a tag 300 for a cache line in accordance with an embodiment of the present invention. Tag 300 includes higher-order address bits 302 for the corresponding cache line. Tag 300 also includes state bits 304, which specify a MOESI state for the corresponding cache line. Note that these state bits 304 can also indicate other information for the corresponding cache line, such whether or not the corresponding cache line is dirty.

Process of Diagnosing the Cause of a Memory Error

Figure 4:
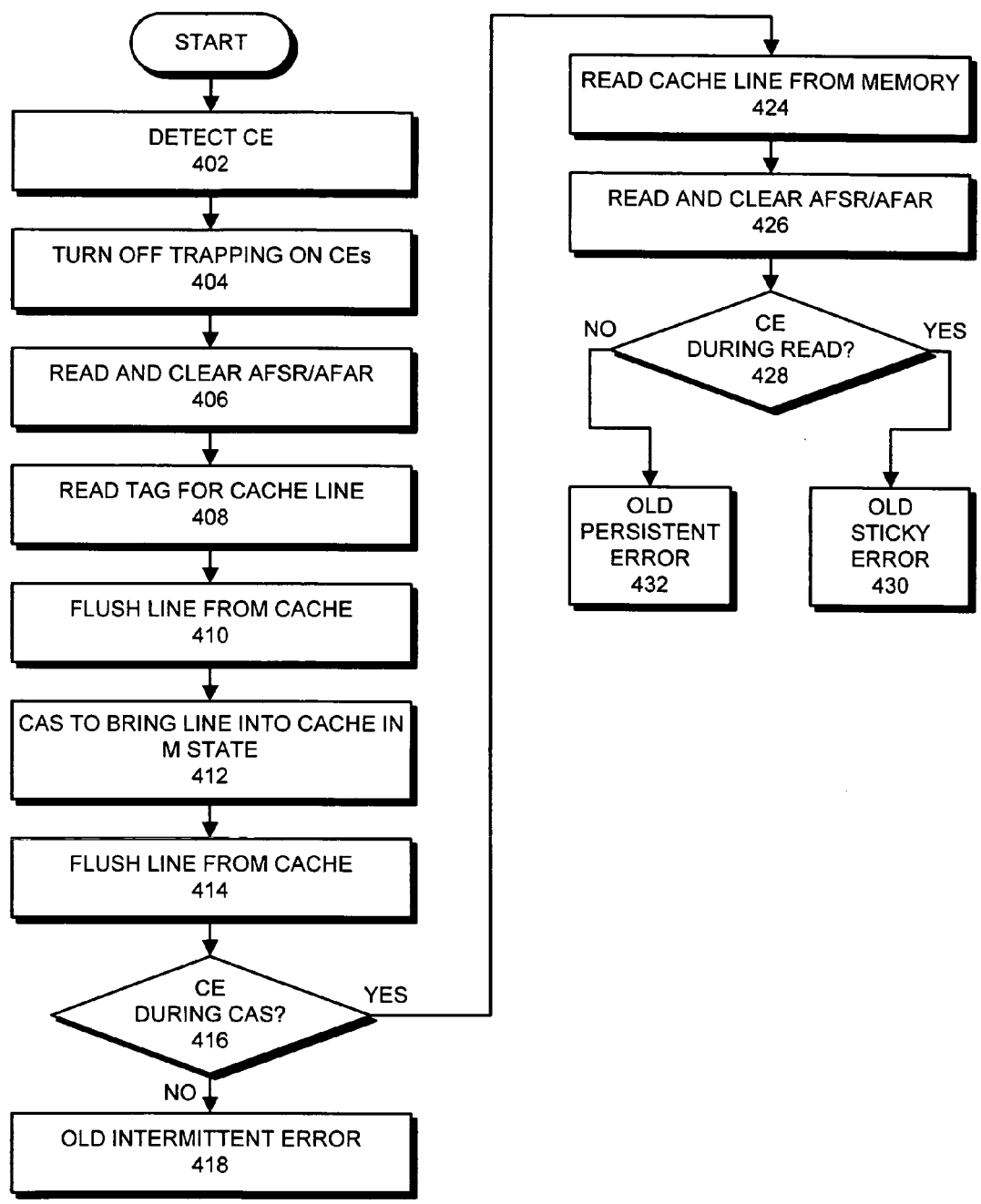
FIG. 4 presents part of a flow chart for the process of diagnosing the cause of a memory error in accordance with an embodiment of the present invention.

FIG. 4 presents a portion of a flow chart illustrating the process of diagnosing the cause of a memory error in accordance with an embodiment of the present invention. This process starts when a correctable error is detected by ECC circuitry within the processor during a read operation from a location in main memory (step 402).

In response to this correctable error, the system performs a number of actions. First, the system turns off trapping for correctable errors (CEs) (step 404), and reads and clears the AFSR/AFAR registers (step 406). Next, the system reads the tag from the cache line associated with the memory location (step 408).

The system then flushes the cache line from the cache (step 410). This ensures that a subsequent read operation directed to the memory location will cause the cache line to be read from main memory. Next, the system performs a compare-and-swap (CAS) operation to pull the cache line from main memory into the cache in the modified (M) state (step 412). Note that this CAS operation is an atomic operation, which ensures that another process (or processor) does not interfere with the process of bringing the cache line into the cache in the M state.

Next, the system flushes the cache line from the cache back to main memory (step 414). Note that if the CAS operation also caused a CE, error-correcting circuitry will automatically correct the error before the cache line is installed in the cache by the CAS operation. Hence, flushing the cache line back to main memory will cause corrected data to be written to memory.

Next, the system determines if the preceding CAS operation caused a CE, for example, by examining the CE bit in the AFSR (step 416). If not, the system determines that the old error type (under a prior art system) would have been an intermittent error (step 418).

On the other hand, if the system determines at step 416 that the preceding CAS operation also caused a CE, the system reads the cache line from memory again (step 424), and then reads and clears the AFSR/AFAR (step 426).

Next, the system determines if read operation caused a CE (step 428). If so, the system determines that the old error type would have been a sticky error (step 430). Otherwise, the system determines that the old error type would have been a persistent error (step 432).

Figure 5:
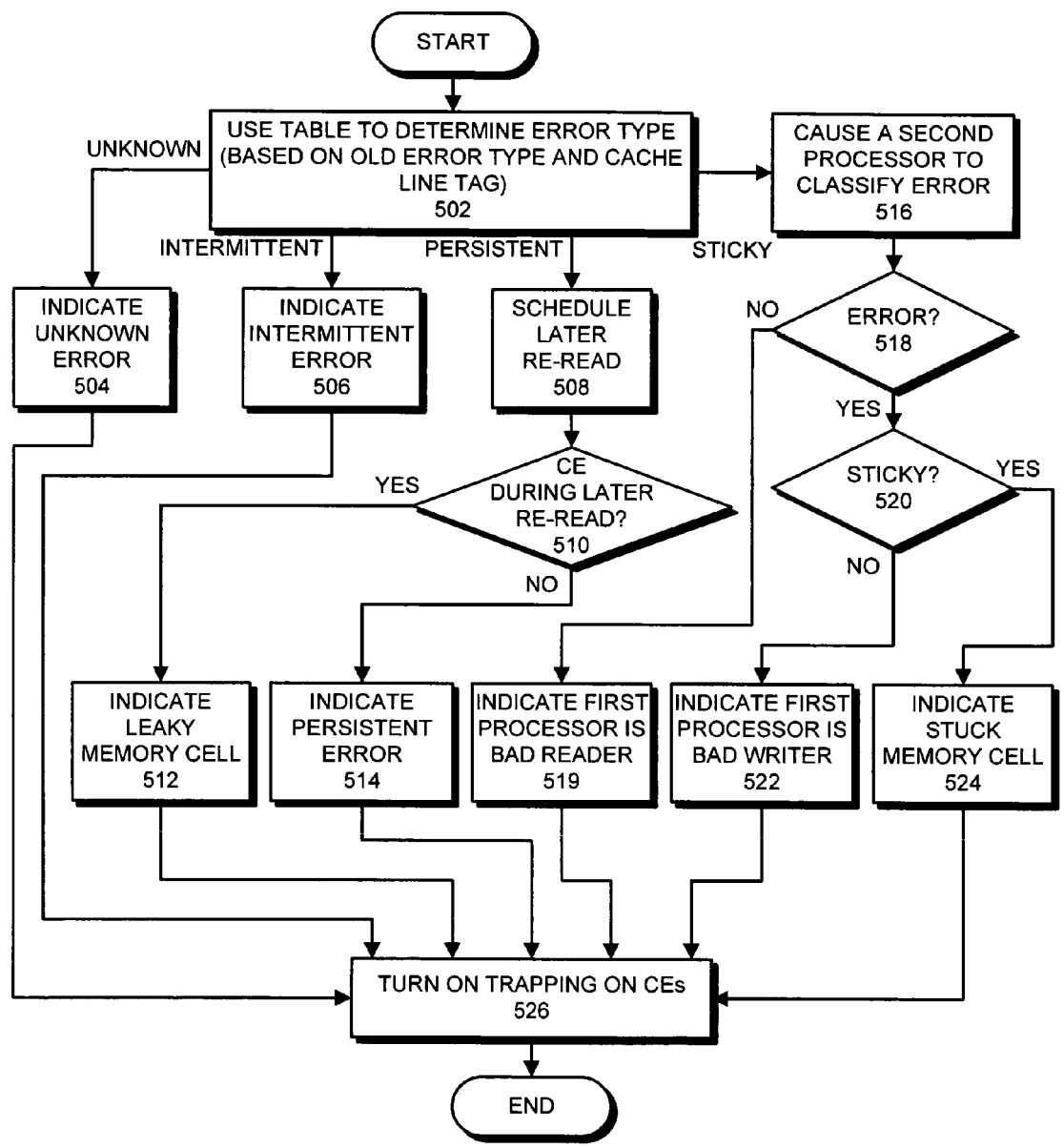
FIG. 5 presents another part of the flow chart for the process of diagnosing the cause of a memory error in accordance with an embodiment of the present invention.

Then, from each of the possible terminal states, 418, 430 and 432, the system proceeds with the operations specified in the flow chart that appears in FIG. 5. First, the system uses Table 1 (which appears below) to determine the new type of error from the old error type and the previously read cache line tag (step 502).

TABLE 1

| AFAR Match | Cache Line State | Old-Type | New-Type |
|---|---|---|---|
| No | N/A | Intermittent | Unknown |
| No | N/A | Persistent | Persistent |
| No | N/A | Sticky | Sticky |
| Yes | I, M, O | Intermittent | Unknown |
| Yes | S, E | Intermittent | Intermittent |
| Yes | I, S, E | Persistent | Persistent |
| Yes | M, O | Persistent | Sticky |
| Yes | Any | Sticky | Sticky |

Next, if Table 1 indicates the new error type is an "unknown," the system indicates an unknown error (step 504). Similarly, if Table 1 indicates the new error type is "intermittent," the system indicates an intermittent error (step 506).

Referring to Table 1, note that if the cache line state was I, M or O (which means that the cache line flush in step 410 would have caused a write to main memory), and the old error type was intermittent, the new error type is "unknown" instead of intermittent. This prevents a false intermittent diagnosis.

Next, if Table 1 indicates the new error type is "persistent," the system schedules and subsequently performs a re-read of the memory location at a later time (step 508). After the re-read completes, the system determines if a correctable error has occurred (step 510). If not, the system indicates a persistent error (step 514). Otherwise, if a correctable error has occurred during the re-read, the system indicates a "leaky memory cell" (step 512). (In this case, charge has leaked off of the memory cell to cause the error during the re-read.)

Next, if Table 1 indicates the new error type is "sticky," the system causes a second processor in the computer system to classify the memory error (step 516). If there no error is detected by the second processor, the system indicates that the first processor is a bad reader (step 519).

Otherwise, the system determines whether the second processor classified the error as a sticky error (step 520). If so, the system indicates that the memory cell is stuck (step 524). If not, the system indicates that the first processor is a bad writer (step 522).

Finally, after the system has indicated various error conditions in states 504, 506, 512, 514, 519, 522 and 524, the system turns trapping back on for CEs (step 526). A this point, the diagnosis process is complete.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining the cause of a correctable memory error, comprising:
   detecting a correctable error during an access to a memory location in a main memory by a first processor, wherein the correctable error is detected by error detection and correction circuitry;
   reading tag bits for a cache line associated with the memory location, wherein the tag bits contain address information for the cache line, as well as state information indicating a coherency protocol state for the cache line;
   testing the memory location by causing the first processor to perform read and write operations to the memory location to produce test results; and
   using the test results and the tag bits to determine the cause of the correctable error, wherein determining the cause of the correctable error involves classifying the correctable error as at least one of an intermittent error, an error caused by a leaky memory cell, a persistent error, a sticky error caused by a stuck memory bit, an error caused because the first processor is a bad writer, an error caused because the first processor is a bad reader, and an unknown error.

2. The method of claim 1, wherein testing the memory location involves:
   clearing an asynchronous fault status register (AFSR) and an asynchronous fault address register (AFAR), which contain information about the correctable error;
   flushing the cache line from the cache;
   reading the memory location again, thereby causing the cache line to be pulled back into the cache from main memory;
   reading and clearing the AFSR and AFAR registers;
   allowing the error detection and correction circuitry to correct the correctable error; and
   flushing the cache line (with the error corrected) back to main memory.

3. The method of claim 1, wherein reading the memory location again involves performing an atomic compare-and-swap (CAS) operation to ensure that the cache line exists in the modified state in the cache.

4. The method of claim 2, wherein if reading the memory location again does not cause a correctable error, determining the cause of the correctable error involves:
   examining the previously read tag bits: and
   classifying the error as an intermittent error if,
   address bits from the tag match corresponding bits of the address for the correctable error read from the AFAR, and if
   the state bits from the tag indicate that the cache line was in either the shared (S) or exclusive (E) states in the cache at the time the tag bits were read.

5. The method of claim 2, wherein if reading the memory location again causes a correctable error, the method further comprises:
   reading the memory location yet again; and
   reading and clearing the AFSR and AFAR registers again.

6. The method of claim 5, wherein if reading the memory yet again does not cause a correctable error, the method further comprises:
   reading the memory location again after a pre-specified time interval;
   if reading the memory location again after the pre-specified time interval causes a correctable error, classifying the error as an error caused by a leaky memory cell; and
   otherwise, classifying the error as a persistent error.

7. The method of claim 5, wherein if reading the memory location yet again causes a correctable error, the method further comprises:
   causing a second processor to classify the correctable error;
   if the second processor does not detect an error, classifying the error as an error caused because the first processor is a bad reader;
   if the second processor detects an error that is not a sticky error, classifying the error as an error caused because the first processor is a bad writer; and
   if the second processor detects a sticky error, classifying the error as a sticky error caused by at least one stuck memory bit.

8. A computer-readable storage medium storing instructions that when executed by a computer cause the computer to perform a method for determining the cause of a correctable memory error, the method comprising:
   detecting a correctable error during an access to a memory location in a main memory by a first processor, wherein the correctable error is detected by error detection and correction circuitry;
   reading tag bits for a cache line associated with the memory location, wherein the tag bits contain address information for the cache line, as well as state information indicating a coherency protocol state for the cache line;
   testing the memory location by causing the first processor to perform read and write operations to the memory location to produce test results; and
   using the test results and the tag bits to determine the cause of the correctable error, wherein determining the cause of the correctable error involves classifying the correctable error as at least one of an intermittent error, an error caused by a leaky memory cell, a persistent error, a sticky error caused by a stuck memory bit, an error caused because the first processor is a bad writer, an error caused because the first processor is a bad reader, and an unknown error.

9. The computer-readable storage medium of claim 8, wherein testing the memory location involves:
   clearing an asynchronous fault status register (AFSR) and an asynchronous fault address register (AFAR), which contain information about the correctable error;
   flushing the cache line from the cache;
   reading the memory location again, thereby causing the cache line to be pulled back into the cache from main memory;
   reading and clearing the AFSR and AFAR registers;
   allowing the error detection and correction circuitry to correct the correctable error; and
   flushing the cache line (with the error corrected) back to main memory.

10. The computer-readable storage medium of claim 8, wherein reading the memory location again involves performing an atomic compare-and-swap (CAS) operation to ensure that the cache line exists in the modified state in the cache.

11. The computer-readable storage medium of claim 9, wherein if reading the memory location again does not cause a correctable error, determining the cause of the correctable error involves:
   examining the previously read tag bits: and
   classifying the error as an intermittent error if,
      address bits from the tag match corresponding bits of the address for the correctable error read from the AFAR, and if
      the state bits from the tag indicate that the cache line was in either the shared (S) or exclusive (E) states in the cache at the time the tag bits were read.

12. The computer-readable storage medium of claim 9, wherein if reading the memory location again causes a correctable error, the method further comprises:
   reading the memory location yet again; and
   reading and clearing the AFSR and AFAR registers again.

13. The computer-readable storage medium of claim 12, wherein if reading the memory yet again does not cause a correctable error, the method farther comprises:
   reading the memory location again after a pre-specified time interval;
   if reading the memory location again after the pre-specified time interval causes a correctable error, classifying the error as an error caused by a leaky memory cell; and
   otherwise, classifying the correctable error as a persistent error.

14. The computer-readable storage medium of claim 12, wherein if reading the memory location yet again causes a correctable error, the method farther comprises:
   causing a second processor to classify the correctable error:
   if the second processor does not detect an error, classifying the error as an
   error caused because the first processor is a bad reader:
   if the second processor detects an error that is not a sticky error, classifying the error as an error caused because the first processor is a bad writer:
   and
   if the second processor detects a sticky error, determining that at least one bit in the memory location is stuck, and classifying the error as a sticky error caused by the at least one stuck memory bit.

15. An apparatus that determines the cause of a correctable memory error, comprising:
   error correction and detection circuitry, wherein the error correction and detection circuitry is configured to detect a correctable error during an access to a memory location in main memory by a first processor;
   a reading mechanism configured to read tag bits for a cache line associated with the memory location, wherein the tag bits contain address information for the cache line, as well as state information indicating a coherency protocol state for the cache line;
   a testing mechanism configured to test the memory location by causing the first processor to perform read and write operations to the memory location to produce test results; and
   an error classification mechanism configured to use the test results and the tag bits to determine the cause of the correctable error, wherein determining the cause of the correctable error involves classifying the correctable error as at least one of an intermittent error, an error caused by a leaky memory cell, a persistent error, a sticky error caused by a stuck memory bit, an error caused because the first processor is a bad writer, an error caused because the first processor is a bad reader, and an unknown error.

16. The apparatus of claim 15, wherein the testing mechanism is configured to:
    clear an asynchronous fault status register (AFSR) and an asynchronous fault address register (AFAR), which contain information about the correctable error;
    flush the cache line from the cache;
    read the memory location again, thereby causing the cache line to be pulled back into the cache from main memory;
    read and clear the AFSR and AFAR registers;
    allow the error detection and correction circuitry to correct the correctable error; and to
    flush the cache line (with the error corrected) back to main memory.

17. The apparatus of claim 15, wherein while reading the memory location again, the testing mechanism is configured to perform an atomic compare-and-swap (CAS) operation to ensure that the cache line exists in the modified state in the cache.

18. The apparatus of claim 16, wherein if reading the memory location again does not cause a correctable error, the error classification mechanism is configured to:
    examine the previously read tag bits: and
    classify the error as an intermittent error if,
        address bits from the tag match corresponding bits of the address for the correctable error read from the AFAR, and if
        the state bits from the tag indicate that the cache line was in either the shared (S) or exclusive (E) states in the cache at the time the tag bits were read.

19. The apparatus of claim 16, wherein if reading the memory location again causes a correctable error, the error classification mechanism is configured to:
    read the memory location yet again; and to
    read and clear the AFSR and AFAR registers again.

20. The apparatus of claim 19, wherein if reading the memory yet again does not cause a correctable error, the error classification mechanism is configured to:
    read the memory location again after a pre-specified time interval; and
    if reading the memory location again after the pre-specified time interval causes a correctable error, to classify the error as an error caused by a leaky memory cell; and
    otherwise, to classify the correctable error as a persistent error.

21. The apparatus of claim 19, wherein if reading the memory location yet again causes a correctable error, the error classification mechanism is configured to:
    cause a second processor to classify the correctable error:
    if the second processor does not detect an error, to classify the error as an
    error caused because the first processor is a bad reader:
    if the second processor detects an error that is not a sticky error, to classify the error as an error caused because the first processor is a bad writer; and
    if the second processor detects a sticky error, to determine that at least one bit in the memory location is stuck, and to classify the error as a sticky error caused by the at least one stuck memory bit.

* * * * *

UNITED STATES PATENT AND TRADEMARK OFFICE
CERTIFICATE OF CORRECTION

PATENT NO. : 7,596,738 B2  Page 1 of 1
APPLICATION NO. : 10/992056
DATED : September 29, 2009
INVENTOR(S) : Stephen A. Chessin et al.

It is certified that error appears in the above-identified patent and that said Letters Patent is hereby corrected as shown below:

(column 8, line 25), please replace the word "farther" with the word --further--.

(column 8, line 35), please replace the word "farther" with the word --further--.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO.       : 7,596,738 B2                                           Page 1 of 1
APPLICATION NO.  : 10/992056
DATED            : September 29, 2009
INVENTOR(S)      : Chessin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1342 days.

Signed and Sealed this

Fourteenth Day of December, 2010

David J. Kappos
*Director of the United States Patent and Trademark Office*